April 10, 1956
T. STOTT ET AL
2,741,512
ADJUSTING MECHANISM FOR DEFLECTOR OF
FORAGE HARVESTER DISCHARGE SPOUT
Filed Jan. 8, 1953
3 Sheets-Sheet 1
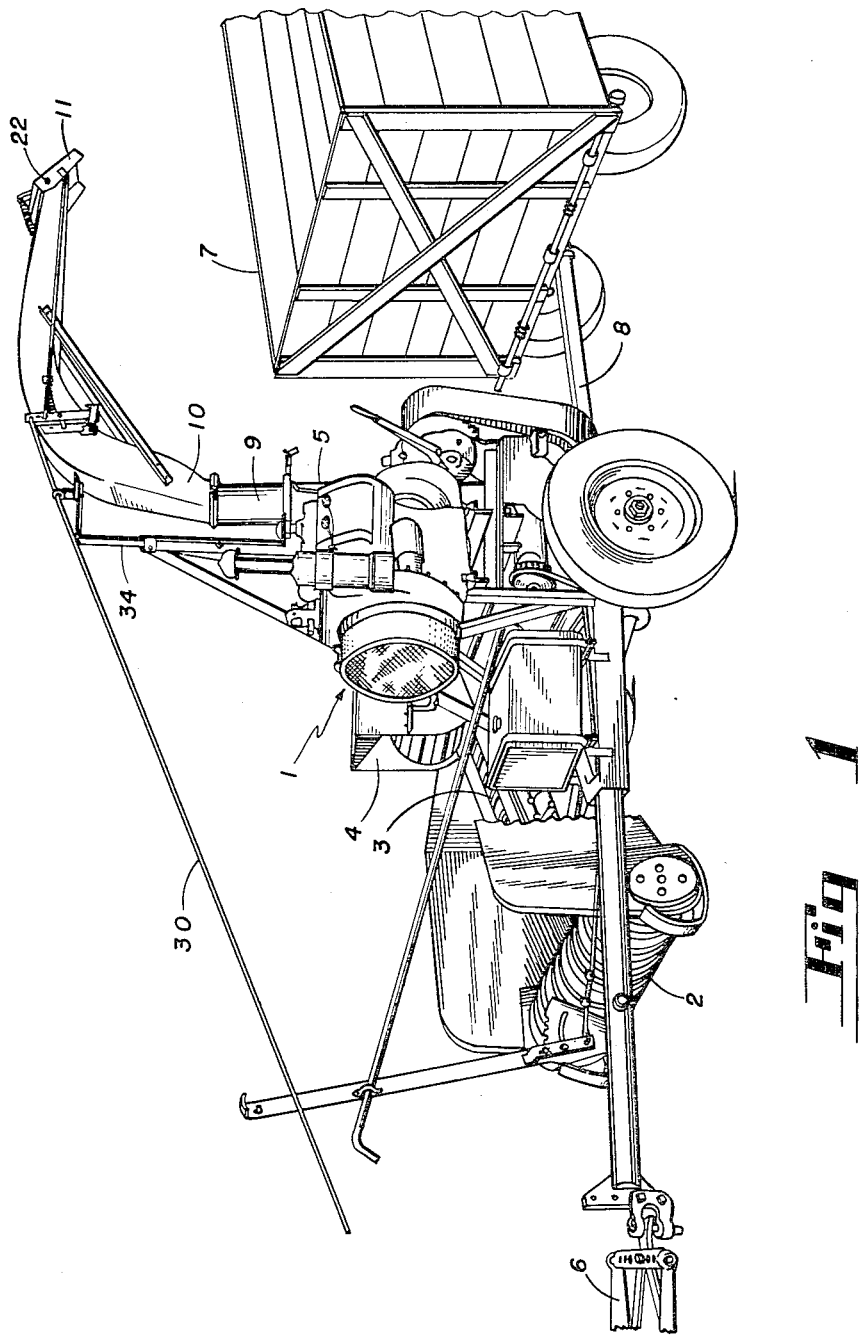
INVENTORS.
TED STOTT.
CLAYTON M. SHEPSTONE.
BY Alden D. Redfield
Warren Kunz.
ATTORNEYS.

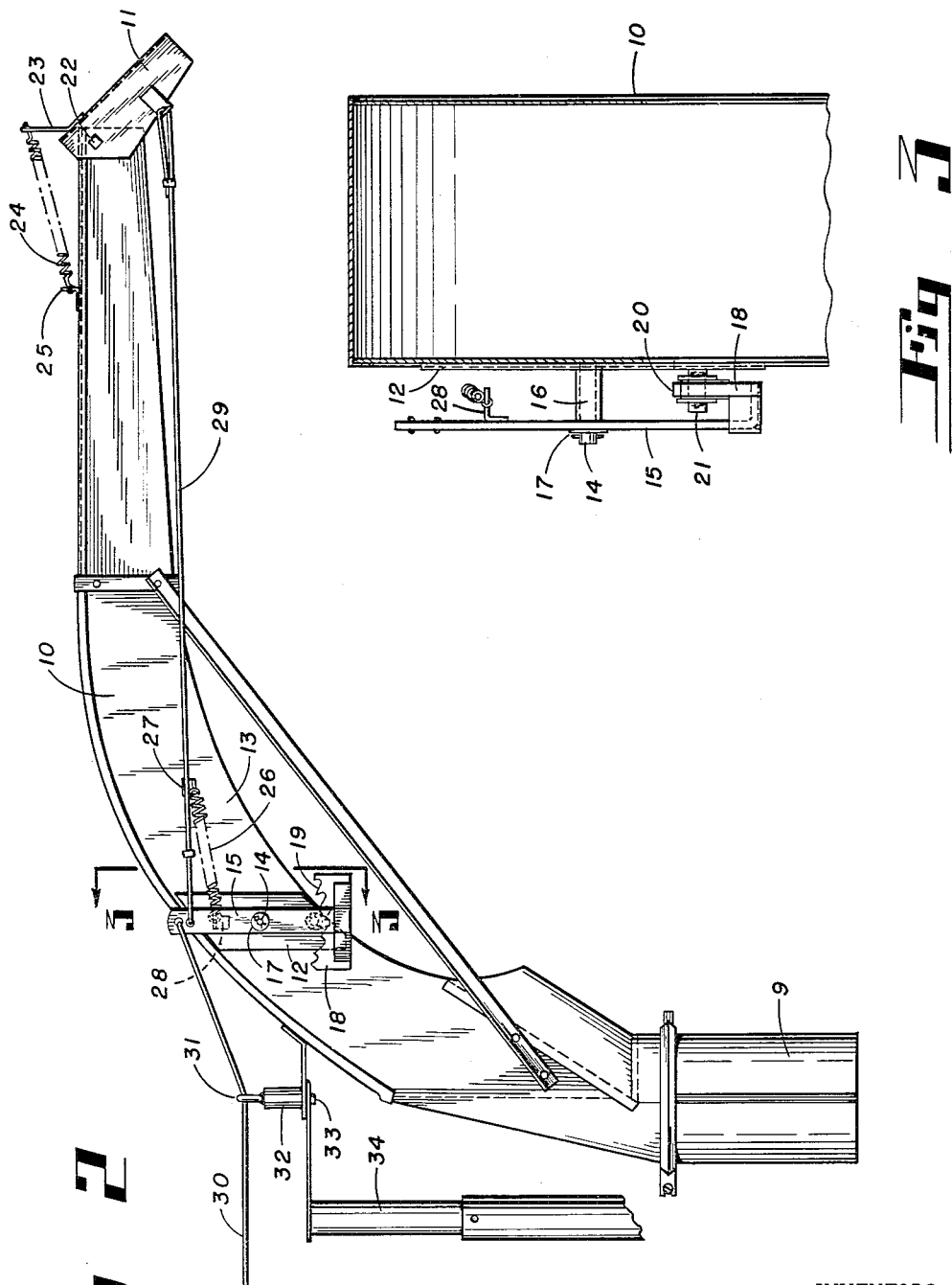

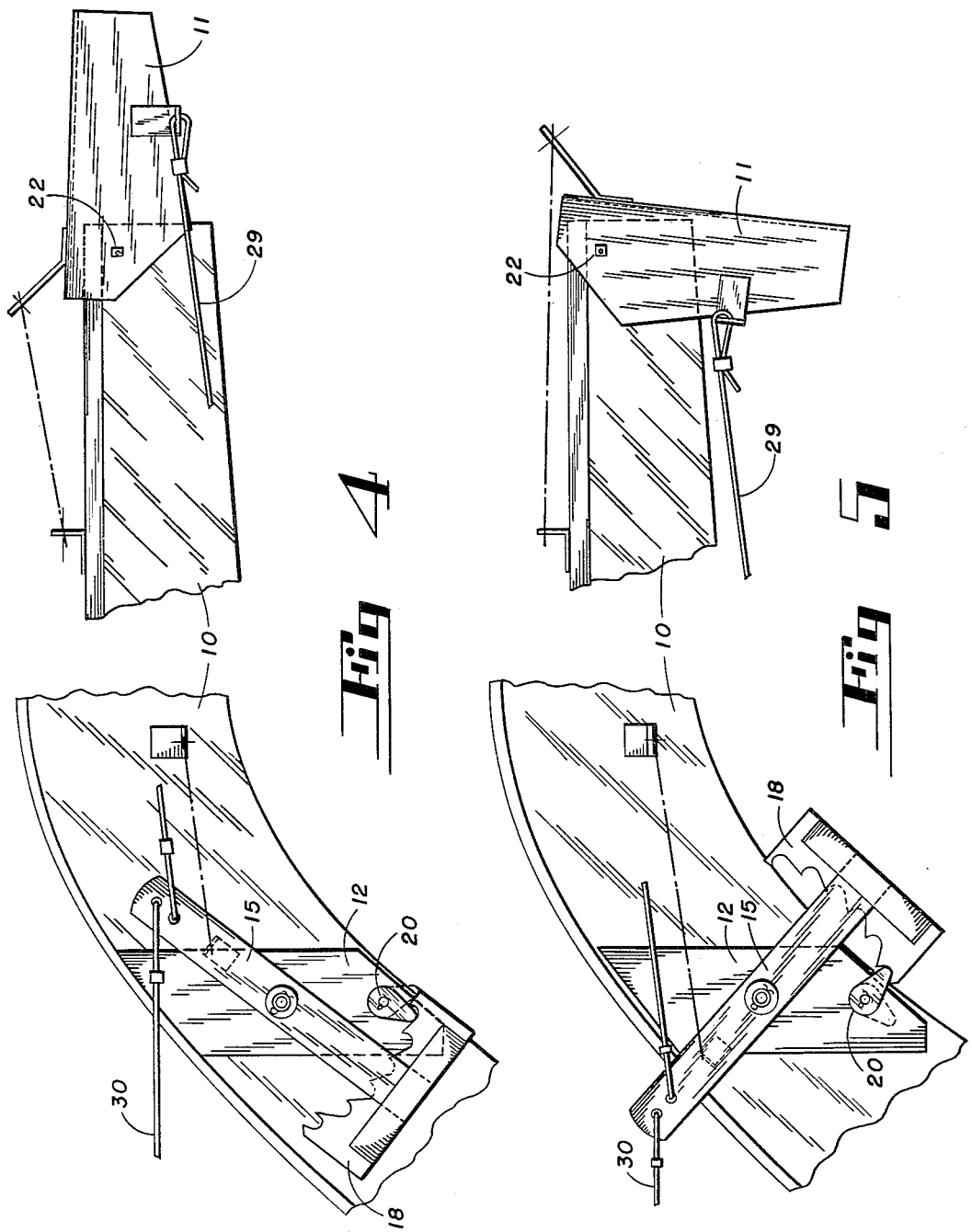

United States Patent Office 2,741,512
Patented Apr. 10, 1956

2,741,512

ADJUSTING MECHANISM FOR DEFLECTOR OF FORAGE HARVESTER DISCHARGE SPOUT

Ted Stott, Celina, and Clayton M. Shepstone, Coldwater, Ohio, assignors to Avco Manufacturing Corporation, Cincinnati, Ohio, a corporation of Delaware Application January 8, 1953, Serial No. 330,208

2 Claims. (Cl. 302—61)

The present invention relates to a forage harvester and, more particularly, to a device for adjusting the position of a deflector associated with the harvester discharge spout through which chopped forage materials are delivered to a wagon or other vehicle.

More specifically, the present invention relates to a ratchet type adjusting mechanism for positioning the deflector of a forage harvester discharge spout in any one of a plurality of preferred positions. Briefly stated, the present invention comprises a lever pivotally secured to a side wall of the discharge spout. Secured to the upper end of the lever is a cable which is also connected to a deflector pivotally secured to the end of the spout. Attached to the lower end of the lever is a ratchet plate positioned to cooperate with a freely pivoted pawl which is also secured to the side wall of the spout. Springs, stretched between the spout and the lever and between the spout and the deflector, constantly urge the deflector into a fully open position. A control cable extends from the top of the lever to the operator's position on a tractor or other draft device used to pull the forage harvester.

The formation of the ratchet plate and pawl is such that movement of the plate beyond its extreme position of use releases the pawl and reverses its angular position so that the deflector and lever can be returned by the springs to the original position of use.

The utility of the present invention will be readily appreciated by those skilled in the art. As is well-known to such persons, modern forage harvesters are designed to harvest forage crops from a field, and to chop the materials into fine particles suitable for storage in a silo. Normally a wagon is attached behind the harvester and the chopped materials are blown by the harvester through a discharge spout and into the wagon. Chopped material is relatively fluffy and, as a result, a relatively large volume can be loaded into a wagon for hauling to a silo. Because of the large volume of material handled, it is necessary to distribute it uniformly in the wagon and, for this reason, an adjustable deflector of the type described is particularly advantageous. By setting the deflector at various predetermined positions, it is possible to distribute the material uniformly as it is discharged into the wagon, and the wagon may be filled to an even depth so that its full carrying capacity is utilized.

It is also a feature of the present invention to provide an adjusting mechanism for the deflector of a harvesting spout which is effective regardless of the position assumed by the spout. Although the more usual practice is to attach the wagon directly behind the harvester, occasionally it is convenient to position the wagon to one side or the other of the harvester, and the discharge spout must be shifted accordingly to distribute the materials within the wagon wherever positioned. The adjusting mechanism of the present invention makes possible adjustment of the deflector regardless of the position assumed by the spout.

In view of the foregoing, it obviously is a leading object of the present invention to provide an improved adjusting and control mechanism for positioning the deflector of a forage harvester discharge spout.

A more particular object of the invention is to provide a pawl and ratchet type adjusting mechanism permitting preselected accurate positioning of the deflector by the tractor operator. An advantage of the invention is that it is not necessary for the operator to leave the tractor seat in order to effect the desired adjustment.

A still further object of the invention is the provision of a step-by-step adjusting mechanism permitting adjustment of the deflector to a plurality of successive positions.

Still another object of the invention is the provision of an adjusting mechanism which can be readily returned to its initial position of adjustment after a plurality of step-by-step adjustments have been made.

A general object of the present invention is the provision of a simple, durable, cheap adjusting mechanism which is reliable and trouble-free and which does not tend to become jammed by dirt and foreign particles when in use.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

Figure 1 is a perspective view of the complete forage harvester, a portion of a forage wagon being shown behind the harvester;

Figure 2 is an enlarged elevational view of the discharge spout and deflector of the harvester, showing the control mechanism in one of its positions of use;

Figure 3 is a cross sectional view taken on plane 3—3 of Figure 2 showing the attachment of the ratchet lever and associated pawl to the side of the discharge spout;

Figure 4 is a fragmentary view of the discharge spout with the deflector fully extended; and Figure 5 is a fragmentary view of the spout showing the deflector fully closed across the end of the spout.

Shown in Figure 1 is a forage harvester for harvesting forage crops and chopping them into fine particles suitable for storage in a silo. The harvester, generaly designated 1, includes a windrow pickup 2, a feed conveyor 3, a compacting mechanism 4, and a cutting mechanism and blower, indicated at 5. The harvester is pulled by a tractor (not shown), the draft bar of the tractor being indicated at 6. Trailing behind the harvester is a forage wagon 7 connected to the harvester by a draft tongue 8.

As the harvester is drawn across a field, the windrow pickup 2 operates to pick up windrows of hay, or similar material, and to deliver them to the feed conveyor 3. The conveyor in turn carries the hay to the compacting mechanism 4 which compresses the hay into a compact mass suitable for chopping by the cutting mechanism 5. The cutting or chopping mechanism may include a rotary flywheel carrying knife bars and fan blades, adapted not only to chop the hay but also to impart centrifugal force to it. The chopped material is carried in a moving air stream through a pipe 9 and a discharge spout 10 which extends from the pipe over to and above the forage wagon 7.

The specific details of the chopping mechanism have not been disclosed since they do not constitute any part of the present invention. It is sufficient to appreciate that the harvester operates to harvest crops from the field and to chop them into minute particles which are conveyed by an air blast through a spout and into a wagon.

In order to distribute the material uniformly in the wagon, an adjustable deflector 11 is pivotally attached to the discharge end of spout 10. The material passing through the spout impinges against the deflector and is deflected into the wagon. When the deflector is positioned as in Figure 4, the materials being discharged from the spout travel the full length of the wagon and are deposited near its rear end. On the other hand, when the deflector is positioned as in Figure 2, the materials are deposited more nearly toward the center of the wagon. It will be appreciated that as the deflector is moved from the position of Figure 2 towards that of Figure 5 the chopped forage materials are deposited progressively closer to the front end of the wagon. Thus, by adjusting the position of the deflector, the materials may be distributed within the wagon as desired.

The present invention specifically concerns the mechanism for adjusting the deflector 11. As shown in Figure 2, a support plate 12 is welded to a side wall 13 of the spout. Plate 12 supports journal 14 on which is pivotally secured a ratchet lever 15. The ratchet lever is spaced from the wall 13 of the spout by a bushing 16 (Figure 3) and is maintained on the journal by a cotter pin and washer, indicated at 17.

Rigidly secured to the lower end of lever 15 is a ratchet plate 18 having a plurality of ratchet teeth 19. The teeth of the ratchet plate cooperate with a pawl 20 which is mounted for free rotation on another journal 21 secured to plate 12. Journal 21 is positioned beneath journal 14 and is parallel thereto.

With particular reference to Figure 3, it will be noted that the ratchet plate 18 is disposed inwardly of the ratchet lever 15 and that it lies in substantially the same plane as pawl 20 so that the lower end of the pawl may engage teeth 19.

Deflector 11 is pivotally secured to the outer end of the spout, as at 22. Bracket 23, attached to the deflector, is engaged by a tension coil spring 24 which is secured at its other end to the top of the spout at 25. The spring constantly urges the deflector towards its extreme open position shown in Figure 4.

A second tension coil spring 26 extends between a point 27 on the wall of the spout and the upper portion of the ratchet lever 15, being attached to the lever at 28. This spring tends to rotate the ratchet lever in a clockwise direction, as viewed in Figure 2.

A cable 29 extends between the upper end of the ratchet lever and the lower portion of the deflector 11. This cable holds deflector 11 in any position of adjustment determined by lever 15 and prevents its movement to a fully open position under the influence of spring 24.

It will be appreciated that spring 26 constantly urges clockwise rotation of the ratchet lever; however, teeth 19 of the lever are slanted in a direction to engage the lower end of pawl 20 and, when the pawl is engaged with any one of the ratchet teeth, as indicated in Figures 2 and 5, the ratchet lever is held against rotation.

A cable 30 extends from the upper end of lever 15 through an eye 31 and to the seat of the tractor. The tractor operator can effect all positions of adjustment of deflector 11 merely by pulling on cable 30 and imparting rotation to lever 15.

From a study of Figures 4 and 5, it will be appreciated that lever 15 can be advanced from the position shown in Figure 4 to the extreme position of use shown in Figure 5 by a force applied to cable 30. As the lever progresses step by step from the one extreme position to the other, pawl 20 successively engages each of the teeth of the ratchet plate 18. Thus, for example, the deflector is shown in an intermediate position of adjustment in Figure 2 with the pawl engaged with a tooth about at the center of the ratchet plate. In Figure 5 the pawl is shown in engagement with the last tooth of the ratchet plate.

If a pull is applied to cable 30 after the ratchet plate has attained the position of Figure 5, the lever will be urged counterclockwise and the pawl, being freely rotatable, will swing from the full toward the dash line position indicated in Figure 5. If the force applied to cable 30 is then released, springs 24 and 26 will impart clockwise rotation to lever 15 and pawl 20 will ride along the ratchet plate until it attains the extreme position shown in Figure 4. As the ratchet plate nears the end of its travel, the pawl will swing from the full line position toward the dash line position shown in Figure 4, and the deflector will come to rest in its wide open position.

In other words, the deflector will have been returned to its initial position of adjustment, and force again applied to cable 30 will impart counterclockwise rotation to lever 15 and will move it to any one of its positions of adjustment with pawl 20 engaged with one of the teeth of the ratchet plate.

It is to be noted that the ratchet plate is not confined in any sort of a guideway; that it is open and has a few simple teeth which are not subject to jamming by dirt and other foreign particles.

Eye 31 is supported on a post 32 which in turn is rotatably positioned by a pin 33 secured to a vertical standard 34. The vertical axis of pin 33 is coincidental with that of pipe 9 so that, as the spout 10 is rotated for various positions of use, eye 31 remains in position above the center of pipe 9. In this way, eye 31 can be maintained in a predetermined position relative to lever 15 and the mechanism of the present invention can be used advantageously regardless of the position assumed by spout 10. Thus, if spout 10 is positioned for rear delivery, as in Figure 1, or for side delivery, the adjusting mechanism is fully effective.

Having described our invention, we claim:

1. In a forage harvester having a discharge spout of the type employing a pivotally mounted deflector urged by a spring toward an open position and having a manually operable tension member to move said deflector from said open position toward a closed position against the action of said spring and ratchet mechanism to hold said deflector in spaced positions less than open position defined by said tension member, characterized by a pawl positioned to coact with teeth of said ratchet inclined in a direction to hold said deflector in said spaced positions against the action of said spring and said pawl pivotally mounted to swing out of engagement with said inclined teeth of said ratchet at an extreme position afforded by said tension member and thereby to allow said pawl to move over said inclined teeth of said ratchet and thereby to allow said deflector to return to full open position as urged by said spring, and after said return said tension member being again operable to move said deflector thru spaced positions less than open position on manual actuation of said tension member.

2. In a forage harvester, a forage discharge spout having a discharge end, an adjustable forage deflector at said discharge end, a resilient member urging said deflector toward an open position, a lever pivotally secured to said spout in spaced relation to said deflector, a connecting member connecting said deflector and said lever at an end remote from its pivot, a second resilient member secured to said lever intermediate its pivot and said connecting member connection urging said lever to a position corresponding to said deflector open position, a manually operable tension means secured to said lever adjacent said connecting member to move said deflector from open position toward a closed position against the action of said resilient members, a ratchet secured to said lever at the end opposite said connecting member connection end, teeth on said ratchet, a freely rotatable pawl pivotally secured to said spout and positioned to co-act with said ratchet teeth to hold said deflector in spaced positions less than open position in response to movements imparted to said tension means, said pawl moving out of engagement with said ratchet teeth at the extreme position of said tension means, thereby allowing said pawl to reverse its position and freely move over said ratchet teeth, thereby allowing said deflector and said lever to return to full open position under the influence of said resilient members, and after said return said tension means being again operable to move said deflector through spaced positions less than open position on manual actuation of said tension means.

References Cited in the file of this patent

UNITED STATES PATENTS

| | | |
|---|---|---|
| 2,022,148 | Ossing | Nov. 26, 1935 |
| 2,465,156 | Huddle | Mar. 22, 1949 |
| 2,563,432 | Sterler | Aug. 7, 1951 |
| 2,670,839 | Aasland | Mar. 2, 1954 |